(12) United States Patent
Nagata et al.

(10) Patent No.: US 9,865,873 B2
(45) Date of Patent: Jan. 9, 2018

(54) POSITIVE ELECTRODE MIXTURE AND ALL-SOLID-STATE LITHIUM SULFUR CELL

(71) Applicant: Nagase ChemteX Corporation, Osaka-shi, Osaka (JP)

(72) Inventors: Hiroshi Nagata, Hyogo (JP); Yasuo Chikusa, Hyogo (JP)

(73) Assignee: NAGASE CHEMTEX CORPORATION, Osaka (JP)

( * ) Notice: Subject to any disclaimer, the term of this patent is extended or adjusted under 35 U.S.C. 154(b) by 0 days.

(21) Appl. No.: 14/896,201

(22) PCT Filed: Mar. 19, 2014

(86) PCT No.: PCT/JP2014/057451
§ 371 (c)(1),
(2) Date: Dec. 4, 2015

(87) PCT Pub. No.: WO2014/203575
PCT Pub. Date: Dec. 24, 2014

(65) Prior Publication Data
US 2016/0118660 A1   Apr. 28, 2016

(30) Foreign Application Priority Data

Jun. 21, 2013 (JP) ................................ 2013-130987
Oct. 2, 2013 (JP) ................................ 2013-207533

(51) Int. Cl.
*H01M 4/00* (2006.01)
*H01M 4/58* (2010.01)
(Continued)

(52) U.S. Cl.
CPC ......... *H01M 4/5815* (2013.01); *H01M 4/136* (2013.01); *H01M 4/38* (2013.01);
(Continued)

(58) Field of Classification Search
CPC ........ H01G 11/24; H01G 11/44; H01G 11/86; H01G 11/42; H01M 4/587; H01M 10/0525; Y02E 60/13
See application file for complete search history.

(56) References Cited

U.S. PATENT DOCUMENTS

| 2012/0009484 | A1 | 1/2012 | Aburatani et al. |
| 2014/0011069 | A1* | 1/2014 | Zhou .................. H01M 10/058 |
|  |  |  | 429/149 |
| 2014/0315102 | A1 | 10/2014 | Tsuji et al. |

FOREIGN PATENT DOCUMENTS

| CN | 102388420 | 3/2012 |
| JP | 2010-033875 | 2/2010 |

(Continued)

*Primary Examiner* — Mark F Huff
*Assistant Examiner* — Monique Wills
(74) *Attorney, Agent, or Firm* — Hamre, Schumann, Mueller & Larson, P.C.

(57) ABSTRACT

The present invention aims to maximize the advantageous physical properties of sulfur and provide a cathode mixture that can be suitably used in a cathode mixture layer of an all-solid-state lithium sulfur battery exhibiting excellent charge/discharge capacity. The present invention also aims to provide an all-solid-state lithium sulfur battery including a cathode mixture layer containing the cathode mixture. The present invention provides a cathode mixture for use in a cathode mixture layer of an all-solid-state lithium sulfur battery, the cathode mixture containing: (A) an ion-conductive material containing phosphorus at a weight ratio of 0.2 to 0.55; (B) sulfur and/or its discharge product (B); and (C) a conductive material, the amount of the component (B) being 40% by weight or more of the total amount of the components (A), (B), and (C).

5 Claims, 1 Drawing Sheet

(51) Int. Cl.
  *H01M 4/62* (2006.01)
  *H01M 4/136* (2010.01)
  *H01M 4/38* (2006.01)
  *H01M 10/052* (2010.01)
  *H01M 10/0562* (2010.01)

(52) U.S. Cl.
  CPC ............ *H01M 4/62* (2013.01); *H01M 10/052* (2013.01); *H01M 10/0562* (2013.01)

(56) References Cited

FOREIGN PATENT DOCUMENTS

| | | |
|---|---|---|
| JP | 2011-181260 | 9/2011 |
| JP | 2012-069305 | 4/2012 |
| JP | 2013-069415 | 4/2013 |
| JP | 2013-110051 | 6/2013 |
| JP | 2013-258079 | 12/2013 |
| JP | 2013-258080 | 12/2013 |
| JP | 2014-029777 | 2/2014 |
| WO | 2013/076955 | 5/2013 |

\* cited by examiner

POSITIVE ELECTRODE MIXTURE AND ALL-SOLID-STATE LITHIUM SULFUR CELL

TECHNICAL FIELD

The present invention relates to a cathode mixture and an all-solid-state lithium sulfur battery.

BACKGROUND ART

Sulfur is known to possess a very high theoretical capacity of about 1672 mAh/g, and lithium-sulfur batteries in which sulfur is used as a cathode active material have been the subject of active studies.

Lithium-sulfur batteries are roughly classified into liquid lithium-sulfur batteries in which the electrolyte is liquid, and all-solid-state lithium sulfur batteries in which the electrolyte is solid.

A drawback of the liquid lithium-sulfur batteries is that lithium polysulfide generated by the reaction of lithium ions with sulfur is dissolved into the electrolyte solution, adversely affecting the charge/discharge capacity and the life of the batteries.

In contrast, the all-solid-state lithium sulfur batteries are free from the drawback that lithium polysulfide is dissolved into the electrolyte solution, and is thus suitable in maintaining the battery charge/discharge capacity and prolonging the battery life. Moreover, for example, they are free of combustible organic solvents and thus can ensure safety without the risk of electrolyte leakage and ignition, and they do not require a separator. These excellent characteristics of the all-solid-state lithium sulfur batteries have been drawing attention.

In the cathode mixture layer of the all-solid-state lithium sulfur batteries, a reversible reaction represented by the following formula (1) occurs, wherein the reaction toward the right predominantly proceeds during discharge, and the reaction toward the left predominantly proceeds during charge.

$$S + 2Li^+ + 2e^- \leftrightarrows Li_2S \qquad (1)$$

In the all-solid-state lithium sulfur batteries, however, since the anode, the solid electrolyte layer, and the cathode mixture layer are substantially free of solvents, and the sulfur contained as a cathode active material in the cathode mixture layer has electrical insulation properties, the cathode mixture layer has very low electron conductivity and very low lithium-ion conductivity. Thus, disadvantageously, the all-solid-state lithium sulfur batteries exhibit poor reactivity in the reaction represented by the formula (1) during charge and discharge, failing to ensure a sufficient charge/discharge capacity.

Patent Literature 1 proposes an electrode material for cathodes of all-solid lithium batteries, which contains sulfur, a conductive material, and a solid electrolyte containing lithium, phosphorus, and sulfur atoms. According to this literature, the electrode material can improve the battery performance of all-solid lithium batteries.

CITATION LIST

Patent Literature

Patent Literature 1: WO 2013/076955

SUMMARY OF INVENTION

Technical Problem

In fact, however, the electrode material for all-solid lithium batteries disclosed in Patent Literature 1 can have difficulty in ensuring a sufficient charge/discharge capacity when used at practical electric current levels even in low power applications such as smartphones or personal computers although it has less difficulty at unpractically low currents.

Thus, the all-solid-state lithium sulfur batteries including the traditional cathode mixture layer still need improvement in their charge/discharge capacity. In the present situation, there is a problem that the advantageous physical properties of sulfur cannot be fully maximized in achieving an all-solid-state lithium sulfur battery that can withstand use at practically high currents.

The present invention aims to maximize the advantageous physical properties of sulfur and provide a cathode mixture that can be suitably used in a cathode mixture layer of an all-solid-state lithium sulfur battery exhibiting excellent charge/discharge capacity. The present invention also aims to provide an all-solid-state lithium sulfur battery including a cathode mixture layer containing the cathode mixture.

Solution to Problem

As a result of various studies on cathode mixtures for use in all-solid-state lithium sulfur batteries, the present inventors obtained the following new findings: by using a cathode mixture obtained by mixing an ion-conductive material, sulfur and/or its discharge product, and a conductive material, wherein the ion-conductive material is (A) an ion-conductive material containing phosphorus in a specific amount (weight ratio), and (B) a specific amount of sulfur and/or its discharge product is used, it is possible to reduce resistance (reaction resistance) during the reaction of sulfur, electrons, and lithium ions at the reaction interface, thereby improving the charge/discharge capacity of an all-solid-state lithium sulfur battery, especially when high current flows. The present invention was completed based on such findings.

The invention disclosed in Patent Literature 1 was made based on a technical idea of reducing resistance (ionic resistance) during the transfer of lithium ions to the reaction interface in the cathode mixture by the use of a highly conductive solid electrolyte when sulfur, which has a high theoretical capacity as a cathode active material but is an electrical insulator, is used. This technical idea is completely different from the technical idea of the present invention which aims to reduce reaction resistance by the use of the specific ion-conductive material (A) and the specific amount of sulfur and/or its discharge product (B). Patent Literature 1 is completely silent about the technical idea of the present invention.

In addition, Patent Literature 1 states that the mixture molar ratio of lithium sulfide to phosphorus pentasulfide to form a solid electrolyte is usually 50:50 to 85:15, which is a wide range. Thus, it discloses a wide range of phosphorus content (weight ratio) in the solid electrolyte. However, the phosphorus content (weight ratio) in the ion-conductive material (A) used in the present invention does not overlap the phosphorus content (weight ratio) in the solid electrolyte which satisfies the requirement ("the percentage of phosphorus atoms contained in a specific peak is 62 mol % or more in the NMR spectrum of the solid electrolyte") of the invention disclosed in Patent Literature 1. This means that Patent Literature 1 is substantially silent about the ion-conductive material (A) containing phosphorus in a specific amount (weight ratio) in the present invention.

A cathode mixture of the present invention includes:

(A) an ion-conductive material containing phosphorus at a weight ratio of 0.2 to 0.55;

(B) sulfur and/or its discharge product; and (C) a conductive material, the amount of the component (B) being 40% by weight or more of the total amount of the components (A), (B), and (C), the cathode mixture being for use in a cathode mixture layer of an all-solid-state lithium sulfur battery.

In the cathode mixture of the present invention, the ion-conductive material (A) is preferably $P_xS_y$, where x and y independently represent integers that give a stoichiometric ratio, and/or a composite of Li, S, and P. The composite of Li, S, and P is preferably obtained by mechanically milling at least $Li_2S$, S, and P, or at least $Li_2S$ and $P_xS_y$, where x and y independently represent integers that give a stoichiometric ratio.

In the cathode mixture of the present invention, the ion-conductive material (A), the sulfur and/or its discharge product (B), and the conductive material (C) are preferably present at a ratio (component (A):component (B):component (C)) of 10-50:40-70:5-25 by weight.

An all-solid-state lithium sulfur battery of the present invention includes: a cathode mixture layer containing the cathode mixture of the present invention; a solid electrolyte layer; an anode; and a collector.

Advantageous Effects of Invention

The cathode mixture of the present invention includes (A) an ion-conductive material containing phosphorus in a specific amount (weight ratio), (B) a specific amount of sulfur and/or its discharge product, and (C) a conductive material. Thus, the use of the cathode mixture in a cathode mixture layer of an all-solid-state lithium sulfur battery can reduce resistance (reaction resistance) during the reaction of sulfur, electrons, and lithium ions at the reaction interface. As a result, an all-solid-state lithium sulfur battery having excellent charge/discharge characteristics can be provided. In particular, the cathode mixture of the present invention is excellent in that it exhibits a high charge/discharge capacity not only when used at a low current (for example, about 0.5 to 1.0 $mA/cm^2$), but also at a high current (for example, 5 $mA/cm^2$ or more).

In addition, the all-solid-state lithium sulfur battery of the present invention includes a cathode mixture layer containing the cathode mixture of the present invention and thus exhibits excellent charge/discharge characteristics.

DESCRIPTION OF EMBODIMENTS

<<Cathode Mixture>>

First, the cathode mixture of the present invention will be described.

The cathode mixture of the present invention is a cathode mixture for use in a cathode mixture layer of an all-solid-state lithium sulfur battery, the cathode mixture including (A) an ion-conductive material containing phosphorus in a specific amount (weight ratio), (B) sulfur and/or its discharge product, and (C) a conductive material, wherein the amount of the component (B) is 40% by weight or more of the total amount of the components (A), (B), and (C).

First, the components (A) to (C) used to prepare the cathode mixture are described.

<(A) Ion-Conductive Material)>

The ion-conductive material (A) functions as a solid electrolyte in the cathode mixture, and contains phosphorus and the weight ratio of phosphorus is 0.2 to 0.55.

In the cathode mixture of the present invention, it is very important to use an ion-conductive material (A) containing phosphorus in which the weight ratio of phosphorus is 0.2 to 0.55. As described above, the use of such an ion-conductive material can reduce resistance (reaction resistance) during the reaction of sulfur, electrons, and lithium ions at the reaction interface in the cathode mixture layer, thereby improving the charge/discharge capacity of an all-solid-state lithium sulfur battery.

In contrast, if the weight ratio of phosphorus in the ion-conductive material (A) is less than 0.2 or more than 0.55, an all-solid-state lithium sulfur battery in which such a cathode mixture is used cannot ensure a sufficient charge/discharge capacity, depending on the amperage during charge or discharge. In this regard, it is considered that if the weight ratio of phosphorus is more than 0.55, phosphorus will excessively act on sulfur, so that the effect of deactivation of sulfur can be increased, resulting in reduced charge/discharge capacity.

The weight ratio of phosphorus in the ion-conductive material (A) is preferably 0.2 to 0.5.

Specific examples of the ion-conductive material (A) include compounds represented by $P_xS_y$, where x and y independently represent integers that give a stoichiometric ratio, and composites of Li, S, and P. These ion-conductive materials (A) may be used alone or in combinations of two or more.

The term "composite" as used herein does not refer to a mere mixture of specific components, but refers to a mixture of specific components to which a mechanical, thermal, or chemical energy has been applied to cause part or all of the specific components to undergo a chemical reaction.

The phrase "formed into a composite" as used herein does not refer to merely mixing specific components, but refers to applying a mechanical, thermal, or chemical energy to a mixture of specific components to cause part or all of the specific components to undergo a chemical reaction.

The composite of Li, S, and P is preferably a composite obtained by mechanically milling at least $Li_2S$, S, and P, or at least $Li_2S$ and $P_xS_y$, where x and y independently represent integers that give a stoichiometric ratio. This is because by mechanical milling, bonds can be easily rearranged and an amorphous ion-conductive material can be obtained.

The composite of $Li_2S$ and $P_xS_y$ may further contain a lithium salt or lithium nitride.

Examples of the lithium salt include, but are not limited to, $Li_3PO_4$, $Li_4SiO_4$, $Li_2O$, $LiI$, and $LiBH_4$.

Examples of the lithium nitride include, but are not limited to, $Li_3N$.

In the case where the ion-conductive material (A) is the composite of $Li_2S$ and $P_xS_y$, the molar ratio of $Li_2S$ in this composite, wherein the total amount of $Li_2S$ and $P_xS_y$ is 100 is not particularly limited as long as the ion-conductive material (A) contains phosphorus at a weight ratio of 0.2 to 0.55.

As described above, mechanical milling is preferred as the method for forming the composite of $Li_2S$ and $P_xS_y$. The mechanical milling may be carried out, for example, by using a planetary ball mill at a rotation speed of 100 to 500 rpm, a revolution speed of 200 to 1000 rpm (in the counter direction to the rotation) for 0.5 to 20 hours.

Whether $Li_2S$ and $P_xS_y$ have been formed into a composite or merely mixed can be determined by Raman spectroscopy. For example, in the case of a composite of $Li_2S$ and $P_2S_5$, a peak at 300 cm$^{-1}$ from $P_2S_5$ used as a raw material of the composite disappears or becomes small relative to the main peak around 400 cm$^{-1}$. This indicates that $Li_2S$ and $P_2S_5$ have been formed into a composite.

<(B) Sulfur and/or its Discharge Product>

The sulfur and/or its discharge product (B) functions as a cathode active material in the cathode mixture.

The sulfur may be elemental sulfur, for example.

Examples of the discharge product of sulfur include, but are not limited to, lithium polysulfides such as $Li_2S_8$, $Li_2S_4$, and $Li_2S_2$, and lithium sulfide ($Li_2S$). These compounds may be used alone or in combinations of two or more. These compounds may also be used with elemental sulfur.

In the cathode mixture of the present invention, the amount of the sulfur and/or its discharge product (B) is 40% by weight or more of the total amount of the ion-conductive material (A), the sulfur and/or its discharge product (B), and the conductive material (C).

If the amount of the component (B) is less than 40% by weight of the total amount of the components (A) to (C), although a certain charge/discharge capacity (for example, 200 mAh/g or more per cathode mixture) can be ensured when low current flows, the charge/discharge capacity will be insufficient when high current flows.

The amount of the sulfur and/or its discharge product (B) is preferably 50% by weight or more of the total amount of the ion-conductive material (A), the sulfur and/or its discharge product (B), and the conductive material (C).

Also, the amount of the component (B) is preferably 70% by weight or less of the total amount of the components (A) to (C). If the amount of the component (B) is more than 70% by weight of the total amount of the components (A) to (C), the amount of the ion-conductive material (A) and the conductive material (C) is reduced, which may result in reduced charge/discharge efficiency.

<(C) Conductive Material>

The cathode mixture of the present invention contains the conductive material (C) as an electronic conductor.

Examples of the conductive material (C) include, but are not limited to, acetylene black, active carbon, furnace black, carbon nanotube, and graphene.

Among these, acetylene black, active carbon, and furnace black are preferred because of their excellent electrical conductivity and large BET specific surface areas. Active carbon and furnace black having a hollow shell structure are more preferred.

The furnace black having a hollow shell structure is one kind of conductive furnace black and has a hollow shell structure with a porosity of about 60 to 80%. The term "hollow shell structure" refers to a structure in which an outer shell in particle form is formed by thinly assembled graphite crystals, and the inside of the outer shell is hollow. Examples of the furnace black having a hollow shell structure include Ketjen black (Lion Corporation).

The BET specific surface area of the conductive material (C) is not particularly limited, but is preferably 10 m$^2$/g or more, more preferably 100 m$^2$/g or more, still more preferably 1000 m$^2$/g or more.

If the BET specific surface area is less than 10 m$^2$/g, the cathode mixture may have insufficient electron conductivity, resulting in reduced charge/discharge efficiency.

In contrast, a preferred upper limit of the specific surface area of the conductive material (C) is 6000 m$^2$/g.

The term "BET specific surface area" as used herein refers to a specific surface area determined by Brenauer-Emmet-Telle (BET) method. Specifically, it is determined using a nitrogen adsorption isotherm measured by adsorbing nitrogen gas onto a sample of the conductive material (C) at liquid nitrogen temperature.

As an apparatus to determine the BET specific surface area, for example, an automatic specific surface area/pore distribution measuring apparatus (BELSORP-mini II, BEL Japan, Inc.) may be used.

The conductive material (C) may be used alone or in combinations of two or more. For example, in the cathode mixture of the present invention, the conductive material (C) may be active carbon having a specific surface area of 1800 m$^2$/g or more ((C1) conductive material). In order to further improve the electron conductivity and charge/discharge capacity of the cathode mixture, the conductive material (C1) may be used in combination with at least one conductive material (C2) selected from the group consisting of graphite, acetylene black, furnace black (for example, furnace black having a hollow shell structure), carbon nanotube, and carbon fiber.

In the case where the conductive material (C) is a combination of the conductive material (C1) and the conductive material (C2), they are preferably present at a ratio (component (C1):component (C2)) of 9.5:0.5 to 5:5 by weight. This is because the reaction shown in the formula (1) can be more promoted by increasing the proportion of the conductive material (C1) which has a large specific surface area and can provide many reaction points with the sulfur and/or its discharge product (B).

In the cathode mixture of the present invention, the ion-conductive material (A), the sulfur and/or its discharge product (B), and the conductive material (C) are preferably present at a ratio (component (A):component (B):component (C)) of 10-50:40-70:5-25, more preferably 10-50:40-65:5-25 by weight.

If the proportion of the ion-conductive material (A) is smaller than the above range, the amount of lithium ions capable of transferring to the cathode may be reduced, resulting in an insufficient charge/discharge capacity. Conversely, if the proportion is larger than the above range, the amount of the conductive material (C) may be reduced, resulting in a reduced charge/discharge capacity per cathode mixture.

Moreover, if the proportion of the conductive material (C) is smaller than the above range, the amount of electrons capable of transferring to the cathode may be reduced, resulting in an insufficient charge/discharge capacity. Conversely, if the proportion is larger than the above range, the amount of the ion-conductive material (A) may be reduced, resulting in a reduced charge/discharge capacity per cathode mixture.

As described above, it is very important that the cathode mixture of the present invention include the ion-conductive material (A) containing phosphorus in a specific amount (weight ratio) and the specific amount of sulfur and/or its discharge product (B) in order to enjoy the effects of the present invention.

The cathode mixture of the present invention may further contain optional components such as a binder or solvent, if necessary, in addition to the components (A) to (C).

<Binder>

The binder is not particularly limited, and thermoplastic resins, thermosetting resins and the like can be used.

Examples include polyethylene, polypropylene, polytetrafluoroethylene (PTFE), polyvinylidene fluoride (PVDF), styrene butadiene rubber, tetrafluoroethylene-hexafluoroethylene copolymer, tetrafluoroethylene-hexafluoropropylene copolymer (FEP), tetrafluoroethylene-perfluoroalkylvinylether copolymer (PFA), vinylidene fluoride-hexafluoropropylene copolymer, vinylidene fluoride-chlorotrifluoroethylene copolymer, ethylene-tetrafluoroethylene copolymer (ETFE resin), polychlorotrifluoroethylene (PCTFE), vinylidene fluoride-pentafluoropropylene copolymer, propylene-tetrafluoroethylene copolymer, ethylene-chlorotrifluoroethylene copolymer (ECTFE), vinylidene fluoride-hexafluoropropylene-tetrafluoroethylene copolymer, vinylidene fluoride-perfluoromethylvinylether-tetrafluoroethylene copolymer, ethylene-acrylate copolymer, polyacrylic acid, sodium polyacrylate, lithium polyacrylate, polymethacrylic acid, sodium polymethacrylate, and lithium polymethacrylate.

These binders may be used alone or in combinations of two or more.

In the case where the cathode mixture of the present invention contains the binder, the amount thereof is not particularly limited, but is preferably 0.01 to 10% by weight of the cathode mixture.

<Solvent>

The use of the cathode mixture containing a solvent facilitates the preparation of a cathode mixture layer. The solvent is removed by drying in the preparation of a cathode mixture layer.

Examples of the solvent include, but are not limited to, amine solvents such as N,N-dimethylaminopropylamine and diethylenetriamine; ether solvents such as tetrahydrofuran; ketone solvents such as methyl ethyl ketone; ester solvents such as methyl acetate; amide solvents such as dimethylacetamide and 1-methyl-2-pyrrolidone; and hydrocarbon solvents such as toluene, xylene, n-hexane, and cyclohexane.

These solvents may be used alone or in combinations of two or more.

In the case where the cathode mixture of the present invention contains the solvent, the amount thereof is not particularly limited, but is preferably 10 to 99% by weight of the cathode mixture.

<Method for Preparing Cathode Mixture>

The cathode mixture of the present invention can be obtained by mixing the ion-conductive material (A), the sulfur and/or its discharge product (B), and the conductive material (C), and optional components such as a binder or solvent, if necessary.

These components may be mixed by any conventional method, such as, for example, by using Planetary Ball Mill (Fritsch), Hybridization System (Nara Machinery Co., Ltd.), Cosmos (Kawasaki Heavy Industries, Ltd.), Mechano Fusion System (Hosokawa Micron Corporation), Nobilta NOB (Hosokawa Micron Corporation), Mechanomill (Okada Seiko Co., Ltd.), Thetacomposer (Tokuju Corporation), Nanosonic Mill (Inoue MFG., Inc.), Kneader (Inoue MFG., Inc.), Supermasscolloider (Masuko Sangyo Co., Ltd.), nano-mech REACTOR (Techno-eye), Konel Despa (Asada Iron Works Co., Ltd.), Planetary Mixer (Asada Iron Works Co., Ltd.), Miracle KCK (Asada Iron Works Co., Ltd.), and Vibration Mill (Matsubo Corporation).

In the preparation of the cathode mixture, after the components are mixed, the mixture may be heated.

This is because heat treatment can increase the strength of the contact interface of the ion-conductive material (A), the sulfur and/or its discharge product (B), and the conductive material (C) in the cathode mixture and thus can reduce the interfacial resistance.

The heat treatment may be carried out in any manner, such as, for example, at 80° C. to 250° C., preferably 100° C. to 200° C., for one second to 10 hours in an atmosphere of argon, nitrogen, air or the like.

The heat treatment may be carried out using conventionally known heating apparatuses. Specific examples include constant temperature dryers, fan dryers, vacuum dryers, and infrared dryers.

<<All-Solid-State Lithium Sulfur Battery>>

Next, the all-solid-state lithium sulfur battery of the present invention will be described with reference to drawings.

The all-solid-state lithium sulfur battery of the present invention includes a cathode mixture layer containing the cathode mixture of the present invention, a solid electrolyte layer, an anode, and a collector.

The term "all-solid-state" as used herein refers to one that uses a polymeric solid electrolyte and/or an inorganic solid electrolyte as the electrolyte, in which the anode, the solid electrolyte layer and the cathode mixture layer are substantially free of solvents.

The phrase "substantially free of solvents" as used herein means that a trace amount of solvent may be left.

Figure 1:
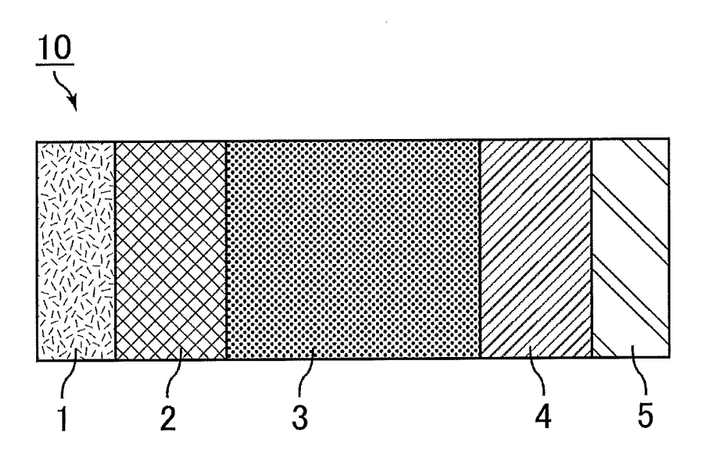
FIG. 1 is a cross-sectional view schematically showing an example of an embodiment of the all-solid-state lithium sulfur battery of the present invention.

FIG. 1 is a cross-sectional view schematically showing an example of an embodiment of the all-solid-state lithium sulfur battery of the present invention.

As shown in FIG. 1, an all-solid-state lithium sulfur battery 10 includes an anode 2, a solid electrolyte layer 3, and a cathode mixture layer 4 that are laminated in this order, and also includes collectors (an anode collector 1 and a cathode collector 5) on its sides.

The collectors (the anode collector and the cathode collector), the anode, the solid electrolyte layer, and the cathode mixture layer are described in this order below.

<Collector>

The collector is not particularly limited. For example, Al, Cu, Ni, stainless steel and the like can be used.

As the anode collector, Cu is preferably used because of its difficulty in forming an alloy with lithium and easy processability into a thin membrane.

As the cathode collector, Al is preferably used because of its easy processability into a thin membrane and low cost.

<Anode>

The anode is not particularly limited as long as it contains a material that absorbs and releases lithium ions as the anode active material. Examples of the material that absorbs and releases lithium ions include metal lithium, lithium alloys, metal oxides, metal sulfides, and carbonaceous materials that absorb and release lithium ions.

Examples of the lithium alloys include alloys of lithium with aluminium, silicon, tin, magnesium, indium, calcium or the like.

Examples of the metal oxides include tin oxides, silicon oxides, lithium titanium oxides, niobium oxides, and tungsten oxides.

Examples of the metal sulfides include tin sulfides and titanium sulfides.

Examples of the carbonaceous materials that absorb and release lithium ions include graphite, coke, mesophase pitch carbon fibers, spherical carbon, and resin baked carbon.

The anode may be prepared by any method. Examples include a method in which the material that absorbs and releases lithium ions is pressed, and a method in which an anode precursor dispersion containing the material that absorbs and releases lithium ions and a solvent is applied to an anode collector, dried and pressed.

The solvent contained in the anode precursor dispersion may be as mentioned for the cathode mixture.

The solvent is used to facilitate application of the anode precursor dispersion, and is removed by drying after application.

<Solid Electrolyte Layer>

The solid electrolyte layer may be formed of a polymeric solid electrolyte and/or an inorganic solid electrolyte.

The inorganic solid electrolyte may be a solid electrolyte having an electric conductivity of 0.1 mS/cm or higher, for example. Although the solid electrolyte is not particularly limited as long as it has an electric conductivity of 0.1 mS/cm or higher, specific examples include lithium salts, lithium sulfides, lithium oxides, and lithium nitrides.

The solid electrolyte is preferably a lithium salt, a lithium sulfide, or a combination thereof, because of their high electric conductivity and low grain boundary resistance.

Examples of the lithium salts include, but are not limited to, $LiBH_4$ and $LiI$.

Examples of the lithium sulfides include, but are not limited to, composites with the $P_xS_y$ described above, specifically, the composites of $Li_2S$ and $P_xS_y$ described above. Other examples include composites of $Li_2S$ and $P_xS_y$ together with $GeS_2$, $SiS_2$, $Li_3PO_4$, $Li_4SiO_4$ or the like.

Examples of the lithium oxides include, but are not limited to, $Li_2O$ and $Li_2O_2$.

Examples of the lithium nitrides include, but are not limited to, $Li_3N$.

These solid electrolytes may be used alone or in combinations of two or more.

The solid electrolyte layer formed of the inorganic solid electrolyte may be obtained by, for example, a method in which the solid electrolyte is press-formed or a method in which the solid electrolyte is dispersed in a solvent and the dispersion is then applied and dried.

The method in which the solid electrolyte is press-formed is not particularly limited, and may be carried out for example by sandwiching and pressing the solid electrolyte between an anode collector and a cathode collector, or by pressing the solid electrolyte using a jig of a press.

In the case where the solid electrolyte layer is prepared by the method in which the solid electrolyte is dispersed in a solvent and the dispersion is then applied and dried, the dried solid electrolyte layer may be pressed in the same manner as described above.

The solvent used for dispersing the solid electrolyte may be as mentioned for the cathode mixture.

In the preparation of the solid electrolyte layer by these methods, heat treatment may be performed at any timing in order to reduce the interfacial resistance of the solid electrolyte layer and to improve the denseness thereof.

Examples of the polymeric solid electrolyte include polyethylene oxide polymers containing lithium salts such as lithium perchlorate or lithium bis(trifluoromethanesulfonyl)amide.

<Cathode Mixture Layer>

The cathode mixture layer may be obtained by, for example, a method in which the cathode mixture is supported on a cathode collector or a method in which the cathode mixture is press-formed.

The method in which the cathode mixture is supported on a cathode collector is not particularly limited, and may be carried out for example by press-forming the cathode mixture, or by making the cathode mixture into a paste using an organic solvent or the like, applying the cathode mixture to a cathode collector, drying and then adhering them by, for example, pressing.

The method in which the cathode mixture is press-formed is not particularly limited, and may be carried out for example by sandwiching and pressing the cathode mixture between a solid electrolyte layer and a cathode collector, or by pressing the cathode mixture using a jig of a press.

The cathode mixture may be applied to a cathode collector by any method, such as by slit die coating, screen coating, curtain coating, knife coating, gravure coating, or electrostatic spray coating.

In the preparation of the cathode mixture layer by these methods, heat treatment may be performed at any timing in order to reduce the interfacial resistance of the cathode mixture layer and to improve the denseness thereof.

The all-solid-state lithium sulfur battery may include a separator and the like in addition to the above-described anode collector, anode, solid electrolyte layer, cathode mixture layer, and cathode collector.

The all-solid-state lithium sulfur battery may have any shape, such as a coin, button, sheet, laminate, cylindrical, flat, or rectangular shape.

<Method for Preparing all-Solid-State Lithium Sulfur Battery>

The all-solid-state lithium sulfur battery may be prepared by any method such as those described below.

First, a solid electrolyte is sandwiched and pressed between an anode collector and a cathode collector to prepare a solid electrolyte layer. Next, after the cathode collector is removed temporarily, a cathode mixture is deposited on one side of the solid electrolyte layer and the stack is sandwiched and pressed between the collectors (the anode collector on the solid electrolyte layer side, and the cathode collector on the cathode mixture side). Thus, the cathode mixture layer and the cathode collector are laminated on one face of the solid electrolyte layer, and the anode collector is laminated on the other face of the solid electrolyte layer. Finally, after the anode collector is removed temporarily, an anode is put on the solid electrolyte layer on the side opposite to the cathode mixture layer and then the anode collector is put on the anode side, followed by pressing. Thus, the anode and the anode collector are laminated on the other face of the solid electrolyte layer. Moreover, the layers may be pressed one by one as described above, or two or more layers may be deposited and pressed together to form a laminate. The all-solid-state lithium sulfur battery can be prepared by such methods.

<Application of all-Solid-State Lithium Sulfur Battery>

The all-solid-state lithium sulfur battery may be used in any application. For example, the all-solid-state lithium sulfur battery is suitable for electrical products that require high energy density, such as hybrid vehicles and electric vehicles.

EXAMPLES

The present invention is described with reference to examples, but the present invention is not limited to these examples.

Comparative Synthesis Example 1

$Li_2S$ and $P_2S_5$ were weighed to give a molar ratio of 80:20 and mixed in a mortar. The mixture was treated in a planetary ball mill at a rotation speed of 250 rpm and a revolution speed of 500 rpm (in the counter direction to the rotation) for 10 hours to prepare an ion-conductive material in which the weight ratio of phosphorus was 0.153.

Comparative Synthesis Example 2

$Li_2S$ and $P_2S_5$ were weighed to give a molar ratio of 70:30 and mixed in a mortar. The mixture was treated in a planetary ball mill at a rotation speed of 250 rpm and a revolution speed of 500 rpm (in the counter direction to the rotation) for 10 hours to prepare an ion-conductive material in which the weight ratio of phosphorus was 0.188.

Synthesis Example 1

$Li_2S$ (Furuuchi Chemical Co.) and $P_2S_5$ (Aldrich) were weighed to give a molar ratio of 65:35 and mixed in a mortar. The mixture was treated in a planetary ball mill at a rotation speed of 250 rpm and a revolution speed of 500 rpm (in the counter direction to the rotation) for 10 hours to prepare an ion-conductive material (A) in which the weight ratio of phosphorus was 0.201.

Synthesis Example 2

$Li_2S$ and $P_2S_5$ were weighed to give a molar ratio of 60:40 and mixed in a mortar. The mixture was treated in a planetary ball mill at a rotation speed of 250 rpm and a revolution speed of 500 rpm (in the counter direction to the rotation) for 10 hours to prepare an ion-conductive material (A) in which the weight ratio of phosphorus was 0.213.

Synthesis Example 3

$Li_2S$ and $P_2S_5$ were weighed to give a molar ratio of 50:50 and mixed in a mortar. The mixture was treated in a planetary ball mill at a rotation speed of 250 rpm and a revolution speed of 500 rpm (in the counter direction to the rotation) for 10 hours to prepare an ion-conductive material (A) in which the weight ratio of phosphorus was 0.231.

Synthesis Example 4

$Li_2S$ and $P_2S_5$ were weighed to give a molar ratio of 40:60 and mixed in a mortar. The mixture was treated in a planetary ball mill at a rotation speed of 250 rpm and a revolution speed of 500 rpm (in the counter direction to the rotation) for 10 hours to prepare an ion-conductive material (A) in which the weight ratio of phosphorus was 0.245.

Synthesis Example 5

$Li_2S$ and $P_2S_5$ were weighed to give a molar ratio of 30:70 and mixed in a mortar. The mixture was treated in a planetary ball mill at a rotation speed of 250 rpm and a revolution speed of 500 rpm (in the counter direction to the rotation) for 10 hours to prepare an ion-conductive material (A) in which the weight ratio of phosphorus was 0.256.

Synthesis Example 6

$Li_2S$ and $P_2S_5$ were weighed to give a molar ratio of 20:80 and mixed in a mortar. The mixture was treated in a planetary ball mill at a rotation speed of 250 rpm and a revolution speed of 500 rpm (in the counter direction to the rotation) for 10 hours to prepare an ion-conductive material (A) in which the weight ratio of phosphorus was 0.265.

Synthesis Example 7

$Li_2S$ and $P_2S_5$ were weighed to give a molar ratio of 10:90 and mixed in a mortar. The mixture was treated in a planetary ball mill at a rotation speed of 250 rpm and a revolution speed of 500 rpm (in the counter direction to the rotation) for 10 hours to prepare an ion-conductive material (A) in which the weight ratio of phosphorus was 0.272.

Synthesis Example 8

$P_2S_5$ was mixed in a mortar to prepare an ion-conductive material (A) in which the weight ratio of phosphorus was 0.279.

Synthesis Example 9

$Li_2S$, red phosphorus (Aldrich), and sulfur were weighed to give a molar ratio of 1.2:2.0:4.4 and mixed in a mortar. The mixture was treated in a planetary ball mill at a rotation speed of 250 rpm and a revolution speed of 500 rpm (in the counter direction to the rotation) for 10 hours to prepare an ion-conductive material (A) in which the weight ratio of phosphorus was 0.240.

Synthesis Example 10

$Li_2S$, red phosphorus, and sulfur were weighed to give a molar ratio of 1.0:2.0:4.6 and mixed in a mortar. The mixture was treated in a planetary ball mill at a rotation speed of 250 rpm and a revolution speed of 500 rpm (in the counter direction to the rotation) for 10 hours to prepare an ion-conductive material (A) in which the weight ratio of phosphorus was 0.243.

Synthesis Example 11

$Li_2S$, red phosphorus, and sulfur were weighed to give a molar ratio of 0.8:2.0:4.8 and mixed in a mortar. The mixture was treated in a planetary ball mill at a rotation speed of 250 rpm and a revolution speed of 500 rpm (in the counter direction to the rotation) for 10 hours to prepare an ion-conductive material (A) in which the weight ratio of phosphorus was 0.245.

Synthesis Example 12

$Li_2S$, red phosphorus, and sulfur were weighed to give a molar ratio of 1.2:2.0:3.2 and mixed in a mortar. The mixture was treated in a planetary ball mill at a rotation speed of 250 rpm and a revolution speed of 500 rpm (in the counter direction to the rotation) for 10 hours to prepare an ion-conductive material (A) in which the weight ratio of phosphorus was 0.282.

Synthesis Example 13

$Li_2S$, red phosphorus, and sulfur were weighed to give a molar ratio of 1.0:2.0:3.4 and mixed in a mortar. The mixture was treated in a planetary ball mill at a rotation speed of 250 rpm and a revolution speed of 500 rpm (in the counter direction to the rotation) for 10 hours to prepare an ion-conductive material (A) in which the weight ratio of phosphorus was 0.286.

Synthesis Example 14

$Li_2S$, red phosphorus, and sulfur were weighed to give a molar ratio of 0.8:2.0:3.6 and mixed in a mortar. The mixture was treated in a planetary ball mill at a rotation speed of 250 rpm and a revolution speed of 500 rpm (in the counter direction to the rotation) for 10 hours to prepare an ion-conductive material (A) in which the weight ratio of phosphorus was 0.289.

Synthesis Example 15

$Li_2S$, red phosphorus, and sulfur were weighed to give a molar ratio of 1.6:2.0:2.6 and mixed in a mortar. The mixture was treated in a planetary ball mill at a rotation speed of 250 rpm and a revolution speed of 500 rpm (in the counter direction to the rotation) for 10 hours to prepare an ion-conductive material (A) in which the weight ratio of phosphorus was 0.283.

Synthesis Example 16

$Li_2S$, red phosphorus, and sulfur were weighed to give a molar ratio of 1.2:2.0:2.8 and mixed in a mortar. The mixture was treated in a planetary ball mill at a rotation speed of 250 rpm and a revolution speed of 500 rpm (in the counter direction to the rotation) for 10 hours to prepare an ion-conductive material (A) in which the weight ratio of phosphorus was 0.299.

Synthesis Example 17

$Li_2S$, red phosphorus, and sulfur were weighed to give a molar ratio of 1.0:2.0:3.0 and mixed in a mortar. The mixture was treated in a planetary ball mill at a rotation speed of 250 rpm and a revolution speed of 500 rpm (in the counter direction to the rotation) for 10 hours to prepare an ion-conductive material (A) in which the weight ratio of phosphorus was 0.303.

Synthesis Example 18

$Li_2S$, red phosphorus, and sulfur were weighed to give a molar ratio of 0.8:2.0:3.2 and mixed in a mortar. The mixture was treated in a planetary ball mill at a rotation speed of 250 rpm and a revolution speed of 500 rpm (in the counter direction to the rotation) for 10 hours to prepare an ion-conductive material (A) in which the weight ratio of phosphorus was 0.308.

Synthesis Example 19

$Li_2S$, red phosphorus, and sulfur were weighed to give a molar ratio of 2.0:2.0:1.6 and mixed in a mortar. The mixture was treated in a planetary ball mill at a rotation speed of 250 rpm and a revolution speed of 500 rpm (in the counter direction to the rotation) for 10 hours to prepare an ion-conductive material (A) in which the weight ratio of phosphorus was 0.302.

Synthesis Example 20

$Li_2S$, red phosphorus, and sulfur were weighed to give a molar ratio of 1.2:2.0:2.4 and mixed in a mortar. The mixture was treated in a planetary ball mill at a rotation speed of 250 rpm and a revolution speed of 500 rpm (in the counter direction to the rotation) for 10 hours to prepare an ion-conductive material (A) in which the weight ratio of phosphorus was 0.319.

Synthesis Example 21

$Li_2S$, red phosphorus, and sulfur were weighed to give a molar ratio of 1.0:2.0:2.6 and mixed in a mortar. The mixture was treated in a planetary ball mill at a rotation speed of 250 rpm and a revolution speed of 500 rpm (in the counter direction to the rotation) for 10 hours to prepare an ion-conductive material (A) in which the weight ratio of phosphorus was 0.324.

Synthesis Example 22

$Li_2S$, red phosphorus, and sulfur were weighed to give a molar ratio of 0.8:2.0:2.8 and mixed in a mortar. The mixture was treated in a planetary ball mill at a rotation speed of 250 rpm and a revolution speed of 500 rpm (in the counter direction to the rotation) for 10 hours to prepare an ion-conductive material (A) in which the weight ratio of phosphorus was 0.329.

Synthesis Example 23

$Li_2S$, red phosphorus, and sulfur were weighed to give a molar ratio of 1.5:2.0:1.9 and mixed in a mortar. The mixture was treated in a planetary ball mill at a rotation speed of 250 rpm and a revolution speed of 500 rpm (in the counter direction to the rotation) for 10 hours to prepare an ion-conductive material (A) in which the weight ratio of phosphorus was 0.323.

Synthesis Example 24

$Li_2S$, red phosphorus, and sulfur were weighed to give a molar ratio of 1.3:2.0:2.1 and mixed in a mortar. The mixture was treated in a planetary ball mill at a rotation speed of 250 rpm and a revolution speed of 500 rpm (in the counter direction to the rotation) for 10 hours to prepare an ion-conductive material (A) in which the weight ratio of phosphorus was 0.328.

Synthesis Example 25

$Li_2S$, red phosphorus, and sulfur were weighed to give a molar ratio of 0.5:2.0:2.9 and mixed in a mortar. The mixture was treated in a planetary ball mill at a rotation speed of 250 rpm and a revolution speed of 500 rpm (in the counter direction to the rotation) for 10 hours to prepare an ion-conductive material (A) in which the weight ratio of phosphorus was 0.348.

Synthesis Example 26

$Li_2S$, red phosphorus, and sulfur were weighed to give a molar ratio of 2.0:2.0:1.0 and mixed in a mortar. The mixture was treated in a planetary ball mill at a rotation speed of 250 rpm and a revolution speed of 500 rpm (in the counter direction to the rotation) for 10 hours to prepare an ion-conductive material (A) in which the weight ratio of phosphorus was 0.333.

Synthesis Example 27

$Li_2S$, red phosphorus, and sulfur were weighed to give a molar ratio of 1.8:2.0:1.2 and mixed in a mortar. The mixture was treated in a planetary ball mill at a rotation speed of 250 rpm and a revolution speed of 500 rpm (in the counter direction to the rotation) for 10 hours to prepare an ion-conductive material (A) in which the weight ratio of phosphorus was 0.338.

Synthesis Example 28

$Li_2S$, red phosphorus, and sulfur were weighed to give a molar ratio of 1.5:2.0:1.5 and mixed in a mortar. The mixture was treated in a planetary ball mill at a rotation speed of 250 rpm and a revolution speed of 500 rpm (in the counter direction to the rotation) for 10 hours to prepare an ion-conductive material (A) in which the weight ratio of phosphorus was 0.346.

Synthesis Example 29

$Li_2S$, red phosphorus, and sulfur were weighed to give a molar ratio of 1.1:2.0:1.9 and mixed in a mortar. The mixture was treated in a planetary ball mill at a rotation speed of 250 rpm and a revolution speed of 500 rpm (in the counter direction to the rotation) for 10 hours to prepare an ion-conductive material (A) in which the weight ratio of phosphorus was 0.357.

Synthesis Example 30

$Li_2S$, red phosphorus, and sulfur were weighed to give a molar ratio of 0.5:2.0:2.5 and mixed in a mortar. The mixture was treated in a planetary ball mill at a rotation speed of 250 rpm and a revolution speed of 500 rpm (in the counter direction to the rotation) for 10 hours to prepare an ion-conductive material (A) in which the weight ratio of phosphorus was 0.375.

Synthesis Example 31

$Li_2S$, red phosphorus, and sulfur were weighed to give a molar ratio of 1.2:2.0:1.4 and mixed in a mortar. The mixture was treated in a planetary ball mill at a rotation speed of 250 rpm and a revolution speed of 500 rpm (in the counter direction to the rotation) for 10 hours to prepare an ion-conductive material (A) in which the weight ratio of phosphorus was 0.382.

Synthesis Example 32

$Li_2S$, red phosphorus, and sulfur were weighed to give a molar ratio of 1.6:2.0:0.8 and mixed in a mortar. The mixture was treated in a planetary ball mill at a rotation speed of 250 rpm and a revolution speed of 500 rpm (in the counter direction to the rotation) for 10 hours to prepare an ion-conductive material (A) in which the weight ratio of phosphorus was 0.384.

Synthesis Example 33

$Li_2S$, red phosphorus, and sulfur were weighed to give a molar ratio of 0.8:2.0:1.4 and mixed in a mortar. The mixture was treated in a planetary ball mill at a rotation speed of 250 rpm and a revolution speed of 500 rpm (in the counter direction to the rotation) for 10 hours to prepare an ion-conductive material (A) in which the weight ratio of phosphorus was 0.431.

Synthesis Example 34

$Li_2S$, red phosphorus, and sulfur were weighed to give a molar ratio of 0.6:2.0:0.8 and mixed in a mortar. The mixture was treated in a planetary ball mill at a rotation speed of 250 rpm and a revolution speed of 500 rpm (in the counter direction to the rotation) for 10 hours to prepare an ion-conductive material (A) in which the weight ratio of phosphorus was 0.538.

Synthesis Example 35

$Li_2S$, red phosphorus, and sulfur were weighed to give a molar ratio of 1.8:2.0:2.2 and mixed in a mortar. The mixture was treated in a planetary ball mill at a rotation speed of 250 rpm and a revolution speed of 500 rpm (in the counter direction to the rotation) for 10 hours to prepare an ion-conductive material (A) in which the weight ratio of phosphorus was 0.288.

Synthesis Example 36

$Li_2S$, red phosphorus, and sulfur were weighed to give a molar ratio of 1.6:2.0:2.4 and mixed in a mortar. The mixture was treated in a planetary ball mill at a rotation speed of 250 rpm and a revolution speed of 500 rpm (in the counter direction to the rotation) for 10 hours to prepare an ion-conductive material (A) in which the weight ratio of phosphorus was 0.292.

Synthesis Example 37

$Li_2S$, red phosphorus, and sulfur were weighed to give a molar ratio of 1.6:2.0:2.0 and mixed in a mortar. The mixture was treated in a planetary ball mill at a rotation speed of 250 rpm and a revolution speed of 500 rpm (in the counter direction to the rotation) for 10 hours to prepare an ion-conductive material (A) in which the weight ratio of phosphorus was 0.310.

Synthesis Example 38

$Li_2S$, red phosphorus, and sulfur were weighed to give a molar ratio of 1.4:2.0:2.2 and mixed in a mortar. The mixture was treated in a planetary ball mill at a rotation speed of 250 rpm and a revolution speed of 500 rpm (in the counter direction to the rotation) for 10 hours to prepare an ion-conductive material (A) in which the weight ratio of phosphorus was 0.315.

Comparative Synthesis Example 3

$Li_2S$, red phosphorus, and sulfur were weighed to give a molar ratio of 0.4:2.0:0.8 and mixed in a mortar. The mixture was treated in a planetary ball mill at a rotation speed of 250 rpm and a revolution speed of 500 rpm (in the counter direction to the rotation) for 10 hours to prepare an ion-conductive material in which the weight ratio of phosphorus was 0.584.

Examples 1 to 38 and Comparative Examples 1 and 2

The ion-conductive materials obtained in Synthesis Examples 1 to 38 and Comparative Synthesis Examples 1 and 3 were each used as (A) an ion-conductive material, sulfur (Aldrich) was used as (B) sulfur and/or its discharge product, and furnace black having a hollow shell structure (specific surface area: 1200 $m^2/g$, Lion Corporation, Ketjen black EC-600JD) was used as (C) a conductive material. An amount of 80 mg of the ion-conductive material (A), 100 mg of the sulfur and/or its discharge product (B), and 20 mg of the conductive material (C) were weighed so that these components were present in a compositional ratio (weight ratio) of 40:50:10. These components were then mixed in a 45-mL pot containing zirconia balls (5 mm, about 40 g) of a planetary ball mill (Fritsch, Premium Line P-7, revolution radius: 0.07 m, rotation radius: 0.0235 m, ratio of rotation to revolution: −2) at an revolution speed of 370 rpm for 4 hours to prepare a cathode mixture for all-solid-state lithium sulfur batteries.

Examples 39 to 44 and Comparative Examples 3 and 4

Cathode mixtures were prepared in the same manner as in Example 1, except that the ion-conductive materials obtained in Synthesis Examples 1, 2, and 5 to 8 and Comparative Synthesis Examples 1 and 2 were used as the ion-conductive material (A), and 100 mg of the ion-conductive material (A), 80 mg of the sulfur and/or its discharge product (B), and 20 mg of the conductive material (C) were weighed so that the components (A), (B), and (C) were present in a compositional ratio (weight ratio) of 50:40:10.

Examples 45 to 50 and Comparative Example 5

Cathode mixtures were prepared in the same manner as in Example 1, except that the ion-conductive materials obtained in Synthesis Examples 2, 4, 24, 31, 35, and 36 and Comparative Synthesis Example 1 were used as the ion-conductive material (A), and 60 mg of the ion-conductive material (A), 120 mg of the sulfur and/or its discharge product (B), and 20 mg of the conductive material (C) were weighed so that the components (A), (B), and (C) were present in a compositional ratio (weight ratio) of 30:60:10.

Examples 51 and 52 and Comparative Example 6

Cathode mixtures were prepared in the same manner as in Example 1, except that the ion-conductive materials obtained in Synthesis Examples 30 and 31 and Comparative Synthesis Example 1 were used as the ion-conductive material (A), and 46 mg of the ion-conductive material (A), 130 mg of the sulfur and/or its discharge product (B), and 24 mg of the conductive material (C) were weighed so that the components (A), (B), and (C) were present in a compositional ratio (weight ratio) of 23:65:12.

Comparative Examples 7 and 8

Cathode mixtures were prepared in the same manner as in Example 1, except that the ion-conductive materials obtained in Synthesis Example 1 and Comparative Synthesis Example 1 were used as the ion-conductive material (A), sulfur (Aldrich) was used as the sulfur and/or its discharge product (B), acetylene black (specific surface area: 70 $m^2/g$, Wako Pure Chemical Industries, Ltd.) was used as the conductive material (C), and 100 mg of the ion-conductive material (A), 50 mg of the sulfur and/or its discharge product (B), and 50 mg of the conductive material (C) were weighed so that the components (A), (B), and (C) were present in a compositional ratio (weight ratio) of 50:25:25.

A SUS304 cylindrical jig (10 mm Φ, height 10 mm) as an anode collector was inserted into a polycarbonate cylindrical tube jig (inner diameter 10 mm Φ, outer diameter 23 mm Φ, height 20 mm) from the bottom, and 70 mg of a solid electrolyte (a composite obtained by firing $5Li_2S$—$GeS_2$—$P_2S_5$ at 510° C. for 8 hours) was put into the polycarbonate cylindrical tube jig from the top. Then, a SUS304 cylindrical jig (10 mm Φ, height 15 mm) as a cathode collector was inserted into the polycarbonate cylindrical tube jig from the top to sandwich the solid electrolyte therebetween. The solid electrolyte was pressed at a pressure of 200 MPa for 3 minutes to form a solid electrolyte layer having a diameter of 10 mm Φ and a thickness of about 0.6 mm.

Next, after the SUS304 cylindrical jig (cathode collector) inserted from the top was pulled out temporarily, one of the cathode mixtures prepared in Examples 1 to 52 and Comparative Examples 1 to 8 in an amount of 3.75 mg when calculated as sulfur was put on the solid electrolyte layer in the polycarbonate cylindrical tube, and the SUS304 cylindrical jig (cathode collector) was again inserted from the top. The cathode mixture was pressed at a pressure of 200 MPa for 3 minutes to form a cathode mixture layer having a diameter of 10 mm 0 and a thickness of about 0.1 mm.

Next, after the SUS304 cylindrical jig (anode collector) inserted from the bottom was pulled out, a stack of a 0.25-mm-thick lithium sheet (Furuuchi Chemical Co.) punched to a diameter of 8 mm Φ using a hollow punch and a 0.3-mm-thick indium sheet (Furuuchi Chemical Co.) punched to a diameter of 9 mm Φ using a hollow punch as an anode was put into the polycarbonate cylindrical tube jig from the bottom, and the SUS304 cylindrical jig (anode collector) was again inserted from the bottom. The stack was pressed at a pressure of 80 MPa for 3 minutes to form a lithium-indium alloy anode. All-solid-state lithium sulfur batteries in which an anode collector, a lithium-indium alloy anode, a solid electrolyte layer, a cathode mixture layer, and a cathode collector were laminated in this order from the bottom were prepared in the manner described above.

(Charge/Discharge Test)

The all-solid-state lithium sulfur batteries prepared as above were charged to full at a current density of 0.64 $mA/cm^2$ using a charge/discharge device (ACD-M01A, Aska Electronic Co., Ltd.), and then the capacity per cathode mixture of each battery during discharge at a current density of 6.4 $mA/cm^2$ was measured. Table 1 shows the results.

TABLE 1

| Ion-conductive material | | | Compositional ratio (weight ratio) of Components (A), (B) and (C) | | | | | | | | | |
|---|---|---|---|---|---|---|---|---|---|---|---|---|
| | Weight ratio of phosphorus | Electric conductivity (mS/cm) | (A):(B):(C) = 50:25:25 | | (A):(B):(C) = 50:40:10 | | (A):(B):(C) = 40:50:10 | | (A):(B):(C) = 30:60:10 | | (A):(B):(C) = 23:65:12 | |
| | | | Capacity per cathode mixture during discharge at 6.4 $mA/cm^2$ (mAh/g) | | | | | | | | | |
| Comparative Synthesis Example 1 | 0.153 | 0.483 | Com. Ex. 7 | 20 | Com. Ex. 3 | 80 | Com. Ex. 1 | 130 | Com. Ex. 5 | 40 | Com. Ex. 6 | 20 |
| Comparative Synthesis Example 2 | 0.188 | 0.094 | | | Com. Ex. 4 | 180 | | | | | | |
| Synthesis Example 1 | 0.201 | 0.058 | Com. Ex. 8 | 160 | Ex. 39 | 230 | Ex. 1 | 220 | | | | |
| Synthesis Example 2 | 0.213 | 0.021 | | | Ex. 40 | 220 | Ex. 2 | 280 | Ex. 45 | 220 | | |
| Synthesis Example 3 | 0.231 | 0.003 | | | | | Ex. 3 | 260 | | | | |

TABLE 1-continued

| | Ion-conductive material | | Compositional ratio (weight ratio) of Components (A), (B) and (C) | | | | | | | | |
|---|---|---|---|---|---|---|---|---|---|---|---|
| | Weight ratio of phosphorus | Electric conductivity (mS/cm) | (A):(B):(C) = 50:25:25 | | (A):(B):(C) = 50:40:10 | | (A):(B):(C) = 40:50:10 | | (A):(B):(C) = 30:60:10 | | (A):(B):(C) = 23:65:12 |
| | | | Capacity per cathode mixture during discharge at 6.4 mA/cm$^2$ (mAh/g) | | | | | | | | |
| Synthesis Example 4 | 0.245 | <0.001 | | | | | Ex. 4 | 210 | Ex. 46 | 270 | |
| Synthesis Example 5 | 0.256 | <0.001 | | | Ex. 41 | 330 | Ex. 5 | 230 | | | |
| Synthesis Example 6 | 0.265 | <0.001 | | | Ex. 42 | 340 | Ex. 6 | 230 | | | |
| Synthesis Example 7 | 0.272 | <0.001 | | | Ex. 43 | 300 | Ex. 7 | 320 | | | |
| Synthesis Example 8 | 0.279 | <0.001 | | | Ex. 44 | 300 | Ex. 8 | 360 | | | |
| Synthesis Example 9 | 0.240 | 0.009 | | | | | Ex. 9 | 200 | | | |
| Synthesis Example 10 | 0.243 | 0.004 | | | | | Ex. 10 | 310 | | | |
| Synthesis Example 11 | 0.245 | 0.001 | | | | | Ex. 11 | 250 | | | |
| Synthesis Example 12 | 0.282 | 0.001 | | | | | Ex. 12 | 230 | | | |
| Synthesis Example 13 | 0.286 | <0.001 | | | | | Ex. 13 | 260 | | | |
| Synthesis Example 14 | 0.289 | <0.001 | | | | | Ex. 14 | 330 | | | |
| Synthesis Example 15 | 0.283 | 0.047 | | | | | Ex. 15 | 300 | | | |
| Synthesis Example 16 | 0.299 | 0.005 | | | | | Ex. 16 | 250 | | | |
| Synthesis Example 17 | 0.303 | <0.001 | | | | | Ex. 17 | 300 | | | |
| Synthesis Example 18 | 0.308 | <0.001 | | | | | Ex. 18 | 310 | | | |
| Synthesis Example 19 | 0.302 | 0.017 | | | | | Ex. 19 | 330 | | | |
| Synthesis Example 20 | 0.319 | 0.011 | | | | | Ex. 20 | 290 | | | |
| Synthesis Example 21 | 0.324 | 0.002 | | | | | Ex. 21 | 290 | | | |
| Synthesis Example 22 | 0.329 | <0.001 | | | | | Ex. 22 | 290 | | | |
| Synthesis Example 23 | 0.323 | 0.055 | | | | | Ex. 23 | 360 | | | |
| Synthesis Example 24 | 0.328 | 0.059 | | | | | Ex. 24 | 310 | Ex. 47 | 270 | |
| Synthesis Example 25 | 0.348 | <0.001 | | | | | Ex. 25 | 400 | | | |
| Synthesis Example 26 | 0.333 | 0.004 | | | | | Ex. 26 | 330 | | | |
| Synthesis Example 27 | 0.338 | 0.008 | | | | | Ex. 27 | 320 | | | |
| Synthesis Example 28 | 0.346 | 0.033 | | | | | Ex. 28 | 330 | | | |
| Synthesis Example 29 | 0.357 | 0.009 | | | | | Ex. 29 | 340 | | | |
| Synthesis Example 30 | 0.375 | <0.001 | | | | | Ex. 30 | 360 | | | Ex. 51 | 280 |
| Synthesis Example 31 | 0.382 | 0.033 | | | | | Ex. 31 | 330 | Ex. 48 | 340 | Ex. 52 | 280 |
| Synthesis Example 32 | 0.384 | 0.003 | | | | | Ex. 32 | 320 | | | |
| Synthesis Example 33 | 0.431 | 0.009 | | | | | Ex. 33 | 280 | | | |
| Synthesis Example 34 | 0.538 | 0.007 | | | | | Ex. 34 | 200 | | | |
| Synthesis Example 35 | 0.288 | 0.076 | | | | | Ex. 35 | 330 | Ex. 49 | 230 | |
| Synthesis Example 36 | 0.292 | 0.100 | | | | | Ex. 36 | 350 | Ex. 50 | 210 | |
| Synthesis Example 37 | 0.310 | 0.060 | | | | | Ex. 37 | 370 | | | |
| Synthesis Example 38 | 0.315 | 0.071 | | | | | Ex. 38 | 300 | | | |
| Comparative Synthesis Example 3 | 0.584 | 0.003 | | | | | Com. Ex. 2 | 150 | | | |

Table 1 also includes electric conductivities (mS/cm) of the ion-conductive materials prepared in the synthesis examples and the comparative synthesis examples.

The electric conductivity of each ion-conductive material was calculated as follows. A SUS304 cylindrical jig (10 mm Φ, height 10 mm) was inserted into a polycarbonate cylindrical tube jig (inner diameter 10 mm Φ, outer diameter 23 mm Φ, height 20 mm) from the bottom, and 70 mg of the ion-conductive material was put into the polycarbonate cylindrical tube jig from the top. Then, a SUS304 cylindrical jig (10 mm Φ, height 15 mm) was inserted into the polycarbonate cylindrical tube jig from the top to sandwich the ion-conductive material therebetween. The ion-conductive material was pressed at a pressure of 200 MPa for 3 minutes to form an ion-conductive material layer having a diameter of 10 mm Φ and a thickness of about 0.5 mm. Thus, a sample for electric conductivity measurement was prepared. The resistance of the sample was determined by measuring the alternating-current impedance using Cell Test System 1400 available from Solartron, and the electric conductivity was calculated using the thickness and diameter of the ion-conductive material layer (applied voltage 50 mV, measurement frequency 1 to 1,000,000 Hz).

From the evaluation results of the cathode mixtures prepared in Examples 1 to 52 and Comparative Examples 1 to 8, it is demonstrated that an all-solid-state lithium sulfur battery that exhibits excellent charge/discharge capacity when practically high current flows can be obtained if the all-solid-state lithium sulfur battery is formed using a cathode mixture layer including a cathode mixture which contains (A) an ion-conductive material containing phosphorus at a weight ratio of 0.2 to 0.55 and further in which the amount of (B) sulfur and/or its discharge product is 40% by weight or more of the total amount of the ion-conductive material (A), the sulfur and/or its discharge product (B), and a conductive material (C).

In the present invention, cathode mixtures having a charge/discharge capacity per cathode mixture of 200 mAh/g or more are considered to be good.

The following materials were used in Examples 53 to 81 and Comparative Examples 9 to 12 described below.
1. Sulfur and/or its discharge product (B)
Sulfur (Aldrich)
2. Conductive material (C)
Active carbon A (Kansai Coke and Chemicals Co., Ltd., specific surface area: 3000 m$^2$/g, average particle size: 12 μm)
Active carbon B (Kansai Coke and Chemicals Co., Ltd., specific surface area: 2500 m$^2$/g, average particle size: 5 μm)
Active carbon C (Kuraray Co., Ltd., YP80F, specific surface area: 2000 m$^2$/g, average particle size: 6 μm)
Furnace black (Lion Corporation, Ketjen black EC600JD, specific surface area: 1200 m$^2$/g)
Acetylene black (Wako Pure Chemical Industries, Ltd., specific surface area: 70 m$^2$/g)
Graphite (Wako Pure Chemical Industries, Ltd., specific surface area: 5 m$^2$/g)
Carbon fiber (Showa Denko K.K., VGCF-X, specific surface area: 120 to 130 m$^2$/g)

Synthesis Example 39

Li$_2$S and P$_2$S$_5$ were weighed to give a molar ratio of 49:51 and mixed in a mortar. The mixture was treated in a planetary ball mill at a rotation speed of 250 rpm and a revolution speed of 500 rpm (in the counter direction to the rotation) for 10 hours to prepare an ion-conductive material (A) in which the weight ratio of phosphorus was 0.232.

Synthesis Example 40

Li$_2$S, red phosphorus, and sulfur were weighed to give a molar ratio of 1.9:2:2.5 and mixed in a mortar. The mixture was treated in a planetary ball mill at a rotation speed of 250 rpm and a revolution speed of 500 rpm (in the counter direction to the rotation) for 10 hours to prepare an ion-conductive material (A) in which the weight ratio of phosphorus was 0.270.

Comparative Example 9

The ion-conductive material obtained in Comparative Synthesis Example 1 was used as (A) an ion-conductive material, sulfur was used as (B) sulfur and/or its discharge product, and active carbon A (a conductive material (C1)) was used as (C) a conductive material. An amount of 80 mg of the ion-conductive material (A), 100 mg of the sulfur and/or its discharge product (B), and 20 mg of the conductive material (C) were weighed so that these components were present in a ratio (weight ratio) of 40:50:10. These components were then mixed in a 45-mL pot containing zirconia balls (5 mm, about 40 g) of a planetary ball mill (Fritsch, Premium Line P-7, revolution radius: 0.07 m, rotation radius: 0.0235 m, ratio of rotation to revolution: −2) at a revolution speed of 370 rpm for 4 hours to prepare a cathode mixture for all-solid-state lithium sulfur batteries.

Comparative Example 10

A cathode mixture for all-solid-state lithium sulfur batteries was prepared in the same manner as in Comparative Example 9, except for using acetylene black instead of active carbon A (a conductive material (C1)).

Comparative Example 11

A cathode mixture was prepared in the same manner as in Comparative Example 9, except that furnace black was used instead of active carbon A (a conductive material (C1)), and 50 mg of the ion-conductive material (A), 130 mg of the sulfur and/or its discharge product (B), and 20 mg of the conductive material (C) were weighed so that the components (A), (B), and (C) were present in a ratio (weight ratio) of 25:65:10.

Comparative Example 12

A cathode mixture was prepared in the same manner as in Comparative Example 11, except that 40 mg of the ion-conductive material (A), 140 mg of the sulfur and/or its discharge product (B), and 20 mg of the conductive material (C) were weighed so that the components (A), (B), and (C) were present in a ratio (weight ratio) of 20:70:10.

Example 53

The ion-conductive material (A) obtained in Synthesis Example 1 was used as (A) an ion-conductive material, sulfur was used as (B) sulfur and/or its discharge product, and active carbon A (a conductive material (C1)) was used as (C) a conductive material. An amount of 100 mg of the ion-conductive material (A), 80 mg of the sulfur and/or its discharge product (B), and 20 mg of the conductive material (C) were weighed so that these components were present in a ratio (weight ratio) of 50:40:10. These components were then mixed in a 45-mL pot containing zirconia balls (5 mm, about 40 g) of a planetary ball mill (Fritsch, Premium Line P-7, revolution radius: 0.07 m, rotation radius: 0.0235 m, ratio of rotation to revolution: −2) at a revolution speed of 370 rpm for 4 hours to prepare a cathode mixture for all-solid-state lithium sulfur batteries.

Example 54

A cathode mixture was prepared in the same manner as in Example 53, except that 80 mg of the ion-conductive material (A), 100 mg of the sulfur and/or its discharge product (B), and 20 mg of the conductive material (C) were weighed so that the components (A), (B), and (C) were present in a ratio (weight ratio) of 40:50:10.

Example 55

A cathode mixture was prepared in the same manner as in Example 53, except that 60 mg of the ion-conductive material (A), 120 mg of the sulfur and/or its discharge product (B), and 20 mg of the conductive material (C) were weighed so that the components (A), (B), and (C) were present in a ratio (weight ratio) of 30:60:10.

Example 56

A cathode mixture was prepared in the same manner as in Example 53, except that the ion-conductive material (A) obtained in Synthesis Example 39 was used instead of the ion-conductive material (A) obtained in Synthesis Example 1 as the ion-conductive material (A).

Example 57

A cathode mixture was prepared in the same manner as in Example 54, except that the ion-conductive material (A) obtained in Synthesis Example 2 was used instead of the ion-conductive material (A) obtained in Synthesis Example 1 as the ion-conductive material (A).

Example 58

A cathode mixture for all-solid-state lithium sulfur batteries was prepared in the same manner as in Example 57, except for using active carbon B (a conductive material (C1)) instead of active carbon A (a conductive material (C1)).

Example 59

A cathode mixture for all-solid-state lithium sulfur batteries was prepared in the same manner as in Example 57, except for using active carbon C (a conductive material (C1)) instead of active carbon A (a conductive material (C1)).

Example 60

A cathode mixture for all-solid-state lithium sulfur batteries was prepared in the same manner as in Example 55, except for using furnace black instead of active carbon A (a conductive material (C1)).

Examples 61 to 68

Cathode mixtures were prepared in the same manner as in Example 55, except that the ion-conductive materials (A) obtained in Synthesis Examples 2, 39, 4, 8, 40, 35, 31, and 33 were each used instead of the ion-conductive material (A) obtained in Synthesis Example 1 as the ion-conductive material (A).

Example 69

A cathode mixture was prepared in the same manner as in Example 59, except that the ion-conductive material (A) obtained in Synthesis Example 31 was used instead of the ion-conductive material (A) obtained in Synthesis Example 2 as the ion-conductive material (A).

Example 70

A cathode mixture was prepared in the same manner as in Example 64, except that 50 mg of the ion-conductive material (A), 130 mg of the sulfur and/or its discharge product (B), and 20 mg of the conductive material (C) were weighed so that the components (A), (B), and (C) were present in a ratio (weight ratio) of 25:65:10.

Example 71

A cathode mixture was prepared in the same manner as in Example 67, except that 50 mg of the ion-conductive material (A), 130 mg of the sulfur and/or its discharge product (B), and 20 mg of the conductive material (C) were weighed so that the components (A), (B), and (C) were present in a ratio (weight ratio) of 25:65:10.

Example 72

A cathode mixture was prepared in the same manner as in Example 65, except that 40 mg of the ion-conductive material (A), 140 mg of the sulfur and/or its discharge product (B), and 20 mg of the conductive material (C) were weighed so that the components (A), (B), and (C) were present in a ratio (weight ratio) of 20:70:10.

Example 73

The ion-conductive material (A) obtained in Synthesis Example 2 was used as (A) an ion-conductive material, sulfur was used as (B) sulfur and/or its discharge product, and a combination of active carbon A (a conductive material (C1)) and carbon fiber (a conductive material (C2)) in a weight ratio of 9:1 was used as (C) a conductive material. An amount of 60 mg of the ion-conductive material (A), 120 mg of the sulfur and/or its discharge product (B), 18 mg of the conductive material (C1), and 2 mg of the conductive material (C2) were weighed so that the components (A), (B), and (C) were present in a ratio (weight ratio) of 30:60:10. These components were then mixed in a 45-mL pot containing zirconia balls (5 mm, about 40 g) of a planetary ball mill (Fritsch, Premium Line P-7, revolution radius: 0.07 m, rotation radius: 0.0235 m, ratio of rotation to revolution: −2) at a revolution speed of 370 rpm for 4 hours to prepare a cathode mixture for all-solid-state lithium sulfur batteries.

Example 74

A cathode mixture was prepared in the same manner as in Example 73, except for using furnace black instead of carbon fiber as the conductive material (C2).

Example 75

A cathode mixture was prepared in the same manner as in Example 74, except that 50 mg of the ion-conductive material (A), 130 mg of the sulfur and/or its discharge product (B), 18 mg of the conductive material (C1), and 2 mg of the conductive material (C2) were weighed so that the components (A), (B), and (C) were present in a ratio (weight ratio) of 25:65:10.

Example 76

A cathode mixture was prepared in the same manner as in Example 73, except that the ion-conductive material (A) obtained in Synthesis Example 40 was used instead of the ion-conductive material (A) obtained in Synthesis Example 2 as the ion-conductive material (A).

Examples 77 and 78

Cathode mixtures were prepared in the same manner as in Example 74, except that the ion-conductive materials (A) obtained in Synthesis Examples 40 and 35 were each used instead of the ion-conductive material (A) obtained in Synthesis Example 2 as the ion-conductive material (A).

Examples 79 and 80

Cathode mixtures were prepared in the same manner as in Example 75, except that the ion-conductive materials (A) obtained in Synthesis Examples 40 and 35 were each used instead of the ion-conductive material (A) obtained in Synthesis Example 2 as the ion-conductive material (A).

Example 81

The ion-conductive material (A) obtained in Synthesis Example 8 was used as (A) an ion-conductive material, sulfur was used as (B) sulfur and/or its discharge product, and a combination of active carbon A (a conductive material (C1)) and graphite (a conductive material (C2)) in a weight ratio of 9:1 was used as (C) a conductive material. An amount of 60 mg of the ion-conductive material (A), 120 mg of the sulfur and/or its discharge product (B), 18 mg of the conductive material (C1), and 2 mg of the conductive material (C2) were weighed so that the components (A), (B), and (C) were present in a ratio (weight ratio) of 30:60:10. These components were then mixed in a 45-mL pot containing zirconia balls (5 mm, about 40 g) of a planetary ball mill (Fritsch, Premium Line P-7, revolution radius: 0.07 m, rotation radius: 0.0235 m, ratio of rotation to revolution: −2) at a revolution speed of 370 rpm for 4 hours to prepare a cathode mixture for all-solid-state lithium sulfur batteries.

A SUS304 cylindrical jig (10 mm Φ, height 10 mm) as an anode collector was inserted into a polycarbonate cylindrical tube jig (inner diameter 10 mm Φ, outer diameter 23 mm Φ, height 20 mm) from the bottom, and 70 mg of a solid electrolyte (a composite obtained by firing $5Li_2S$—$GeS_2$—$P_2S_5$ at 510° C. for 8 hours) was put into the polycarbonate cylindrical tube jig from the top. Then, a SUS304 cylindrical jig (10 mm Φ, height 15 mm) as a cathode collector was inserted into the polycarbonate cylindrical tube jig from the top to sandwich the solid electrolyte therebetween. The solid electrolyte was pressed at a pressure of 200 MPa for 3 minutes to form a solid electrolyte layer having a diameter of 10 mm Φ and a thickness of about 0.6 mm.

Next, after the SUS304 cylindrical jig (cathode collector) inserted from the top was pulled out temporarily, one of the cathode mixtures prepared in Examples 53 to 81 and Comparative Examples 9 to 12 in an amount of 3.75 mg when calculated as sulfur was put on the solid electrolyte layer in the polycarbonate cylindrical tube, and the SUS304 cylindrical jig (cathode collector) was again inserted from the top. The cathode mixture was pressed at a pressure of 200 MPa for 3 minutes to form a cathode mixture layer having a diameter of 10 mm and a thickness of about 0.1 mm.

Next, after the SUS304 cylindrical jig (anode collector) inserted from the bottom was pulled out, a stack of a 0.25-mm-thick lithium sheet (Furuuchi Chemical Co.) punched to a diameter of 8 mm using a hollow punch and a 0.3-mm-thick indium sheet (Furuuchi Chemical Co.) punched to a diameter of 9 mm Φ using a hollow punch as an anode was put into the polycarbonate cylindrical tube jig from the bottom, and the SUS304 cylindrical jig (anode collector) was again inserted from the bottom. The stack was pressed at a pressure of 80 MPa for 3 minutes to form a lithium-indium alloy anode. All-solid-state lithium sulfur batteries in which an anode collector, a lithium-indium alloy anode, a solid electrolyte layer, a cathode mixture layer, and a cathode collector were laminated in this order from the bottom were prepared in the manner described above.

(Charge/Discharge Test)

The all-solid-state lithium sulfur batteries prepared as above were charged to full at a current density of 0.64 $mA/cm^2$ using a charge/discharge device (ACD-M01A, Aska Electronic Co., Ltd.), and then the capacity per cathode mixture of each battery during discharge to 0.8 V at a current density of 6.4 $mA/cm^2$ was measured. Tables 2 and 3 show the results.

TABLE 2

| (A) Ion-conductive material | | | | Compositional ratio (weight ratio) of Components (A), (B) and (C) | | | | | | | | | |
|---|---|---|---|---|---|---|---|---|---|---|---|---|---|
| | Weight ratio of phosphorus | Electric conductivity (mS/cm) | (C) Conductive material | (A):(B):(C) = 50:40:10 | | (A):(B):(C) = 40:50:10 | | (A):(B):(C) = 30:60:10 | | (A):(B):(C) = 25:65:10 | | (A):(B):(C) = 20:70:10 | |
| | | | | Capacity per cathode mixture during discharge at 6.4 $mA/cm^2$ (mAh/g) | | | | | | | | | |
| Comparative Synthesis Example 1 | 0.153 | 0.483 | Active carbon A Active carbon B Active carbon C Furnace black | | | Com. Ex. 9 | 167 | | | Com. Ex. 11 | 28 | Com. Ex. 12 | 0 |
| | | | Acetylene black | | | Com. Ex. 10 | 0 | | | | | | |
| Synthesis Example 1 | 0.201 | 0.058 | Active carbon A Active carbon B Active carbon C Furnace black Acetylene black | Ex. 53 | 378 | Ex. 54 | 361 | Ex. 55 Ex. 60 | 234 200 | | | | |
| Synthesis Example 2 | 0.213 | 0.021 | Active carbon A Active carbon B Active carbon C Furnace black Acetylene black | | | Ex. 57 Ex. 58 Ex. 59 | 371 259 269 | Ex. 61 | 312 | | | | |

TABLE 2-continued

| (A) Ion-conductive material | | | Compositional ratio (weight ratio) of Components (A), (B) and (C) | | | | | | | | |
|---|---|---|---|---|---|---|---|---|---|---|---|
| | Weight ratio of phosphorus | Electric conductivity (mS/cm) | (C) Conductive material | (A):(B):(C) = 50:40:10 | | (A):(B):(C) = 40:50:10 | | (A):(B):(C) = 30:60:10 | | (A):(B):(C) = 25:65:10 | | (A):(B):(C) = 20:70:10 | |
| | | | | Capacity per cathode mixture during discharge at 6.4 mA/cm$^2$ (mAh/g) | | | | | | | | | |
| Synthesis Example 39 | 0.232 | 0.003 | Active carbon A Active carbon B Active carbon C Furnace black Acetylene black | Ex. 56 | 415 | | | Ex. 62 | 311 | | | | |
| Synthesis Example 4 | 0.245 | <0.001 | Active carbon A Active carbon B Active carbon C Furnace black Acetylene black | | | | | Ex. 63 | 256 | | | | |
| Synthesis Example 8 | 0.279 | <0.001 | Active carbon A Active carbon B Active carbon C Furnace black Acetylene black | | | | | Ex. 64 | 389 | Ex. 70 | 325 | | |
| Synthesis Example 40 | 0.270 | 0.083 | Active carbon A Active carbon B Active carbon C Furnace black Acetylene black | | | | | Ex. 65 | 356 | | | Ex. 72 | 233 |
| Synthesis Example 35 | 0.288 | 0.076 | Active carbon A Active carbon B Active carbon C Furnace black Acetylene black | | | | | Ex. 66 | 269 | | | | |
| Synthesis Example 31 | 0.382 | 0.033 | Active carbon A Active carbon B Active carbon C Furnace black Acetylene black | | | Example 69 | 306 | Ex. 67 | 456 | Ex. 71 | 373 | | |
| Synthesis Example 33 | 0.431 | 0.009 | Active carbon A Active carbon B Active carbon C Furnace black Acetylene black | | | | | Ex. 68 | 456 | | | | |

TABLE 3

| (A) Ion-conductive material | | | Compositional ratio (weight ratio) of Components (A), (B) and (C) | | | | |
|---|---|---|---|---|---|---|---|
| | Weight ratio of phosphorus | Electric conductivity (mS/cm) | (C) Conductive material | (A):(B):(C) = 30:60:10 | | (A):(B):(C) = 25:65:10 | |
| | | | | Capacity per cathode mixture during discharge at 6.4 mA/cm$^2$ (mAh/g) | | | |
| Synthesis Example 2 | 0.213 | 0.021 | Active carbon A + Graphite Active carbon A + Carbon fiber Active carbon A + Furnace black | Ex. 73 Ex. 74 | 267 289 | Ex. 75 | 253 |
| Synthesis Example 8 | 0.279 | <0.001 | Active carbon A + Graphite Active carbon A + Carbon fiber Active carbon A + Furnace black | Ex. 81 | 345 | | |
| Synthesis Example 40 | 0.270 | 0.083 | Active carbon A + Graphite Active carbon A + Carbon fiber Active carbon A + Furnace black | Ex. 76 Ex. 77 | 311 289 | Ex. 79 | 241 |
| Synthesis Example 35 | 0.288 | 0.076 | Active carbon A + Graphite Active carbon A + Carbon fiber Active carbon A + Furnace black | Ex. 78 | 300 | Ex. 80 | 241 |

Tables 2 and 3 also include electric conductivities (mS/cm) of the ion-conductive materials prepared in the synthesis examples and the comparative synthesis examples. The electric conductivity of each ion-conductive material was calculated by the method described above.

REFERENCE SIGNS LIST

1 Anode collector
2 Anode
3 Solid electrolyte layer
4 Cathode mixture layer
5 Cathode collector
10 All-solid-state lithium sulfur battery

The invention claimed is:
1. A cathode mixture for use in a cathode mixture layer of an all-solid-state lithium sulfur battery, the cathode mixture consisting essentially of:
(A) an ion-conductive material containing phosphorus at a weight ratio of 0.2 to 0.55;

(B) sulfur and/or its discharge product; and
(C) a conductive material,
the amount of the component (B) being 40% by weight or more of the total amount of the components (A), (B), and (C).

2. The cathode mixture according to claim 1, wherein the ion-conductive material (A) is $P_xS_y$, where x and y independently represent integers that give a stoichiometric ratio, and/or a composite of Li, S, and P.

3. The cathode mixture according to claim 2, wherein the composite of Li, S, and P is obtained by mechanically milling at least $Li_2S$, S, and P, or at least $Li_2S$ and $P_xS_y$, where x and y independently represent integers that give a stoichiometric ratio.

4. The cathode mixture according to claim 1, wherein the ion-conductive material (A), the sulfur and/or its discharge product (B), and the conductive material (C) are present at a ratio (component (A):component (B):component (C)) of 10-50:40-70:5-25 by weight.

5. An all-solid-state lithium sulfur battery, comprising:
a cathode mixture layer comprising the cathode mixture according to claim 1;
a solid electrolyte layer;
an anode; and
a collector.

* * * * *